Nov. 13, 1928.  1,691,300
B. ORMONT
PROCESS OF AND APPARATUS FOR PRODUCING GASOLINE AND OTHER LIGHT
HYDROCARBONS FROM HEAVIER HYDROCARBONS
Filed Oct. 9, 1923    3 Sheets-Sheet 3

Inventor
Bernard Ormont
by
J.A.Witherspoon
Attorney

Patented Nov. 13, 1928.

1,691,300.

UNITED STATES PATENT OFFICE.

BERNARD ORMONT, OF NEW YORK, N. Y., ASSIGNOR TO BERNARD ORMONT ASSOCIATES, INC., OF NEW YORK, N. Y., A CORPORATION OF NEW YORK.

PROCESS OF AND APPARATUS FOR PRODUCING GASOLINE AND OTHER LIGHT HYDROCARBONS FROM HEAVIER HYDROCARBONS.

Application filed October 9, 1923. Serial No. 667,532.

This invention relates to a process of and an apparatus for producing lighter hydrocarbons such as gasoline from heavier hydrocarbons and has for its object to provide an apparatus which will be simple in construction and comparatively inexpensive to manufacture as compared to those which have been heretofore proposed, while the process is more efficient in operation than those heretofore known.

With these and other objects in view, the invention consists in the novel details of construction and combinations of parts constituting the apparatus, and in the novel steps and combinations of steps constituting the process, all as will be more fully hereinafter disclosed and particularly pointed out in the claims.

This application while presenting a number of features similar to those disclosed in my U. S. Letters Patent No. 1,608,664, dated November 30, 1926, entitled Process for producing gasoline and other hydrocarbons of which this application is a continuation in part and my copending application Serial #526,940, filed January 4, 1922, entitled Process of and apparatus for producing lighter hydrocarbons from heavier hydrocarbons, yet, differs from said applications in that the latent heats involved in the transformation of the hydrocarbons plays an important part in the present invention.

Referring to the accompanying drawings forming a part of this specification, in which like numerals desiginate like parts in all the views.

In order that the present invention may be the better understood, it is said: In this process the oil and water come through pipes in a manner somewhat similar to that disclosed in the prior applications above mentioned, and the mixed water and oil vapors meet at a point before entering the furnace as in said applications. In the processes of my prior applications referred to above, oil is heated in a coil disposed in the upper portion of a furnace for the vaporization of lighter constituents while water is simultaneously heated in a lower coil for the generation of steam. A vertical connection is provided between the two coils so that oil unvaporized in the upper coil flows by gravity toward and into the lower water coil. Here the liquid oil encounters a zone where liquid water is being converted into nascent steam, this zone being referred to in my prior applications as a region of nascent steam. As described in said earlier applications, I have found that in this region of nascent steam the unvaporized oil vaporizes at a temperature considerably below its normal boiling point. The resultant mixture of oil vapor and steam issues upwardly through the vertical connection and is thence passed through a heating coil for further treatment. As stated above, in the present process the oil and water are vaporized in a manner similar to that of my prior applications. In this process, however, the proportion of oil to water by weight, is so chosen that the total latent heat of vaporization of the oil will substantially equal the total latent heat of vaporization of the water, if lighter hydrocarbons such as gasoline is to be produced; while if lubricating oils are to be produced the ratio of oil to water is such that the latent heat of the oil vapor present is less than the latent heat of the water vapor present. In other words, by this process the proportion of the oil to the water may be regulated in accordance with the products desired.

That is to say, if we raise the temperature of the mixed oil and water vapors to about 350° F., the water vapor will be raised to that temperature and would require for production a certain quantity of latent heat or about 970 British thermal units, per pound. The oil on the other hand, would also be raised to 350° F., and would require a total amount of latent heat depending upon the quantity and the particular oil used, so in carrying out this invention, to produce gasoline the quantity of oil employed should be roughly such that the total of its latent heat should substantially equal the total of the latent heat of the water associated with the oil, to the end that in the final vapors produced the water vapor will contain substantially the same number of latent heat thermal units as does the oil vapor, all as will appear more fully hereinafter.

Figure 1:
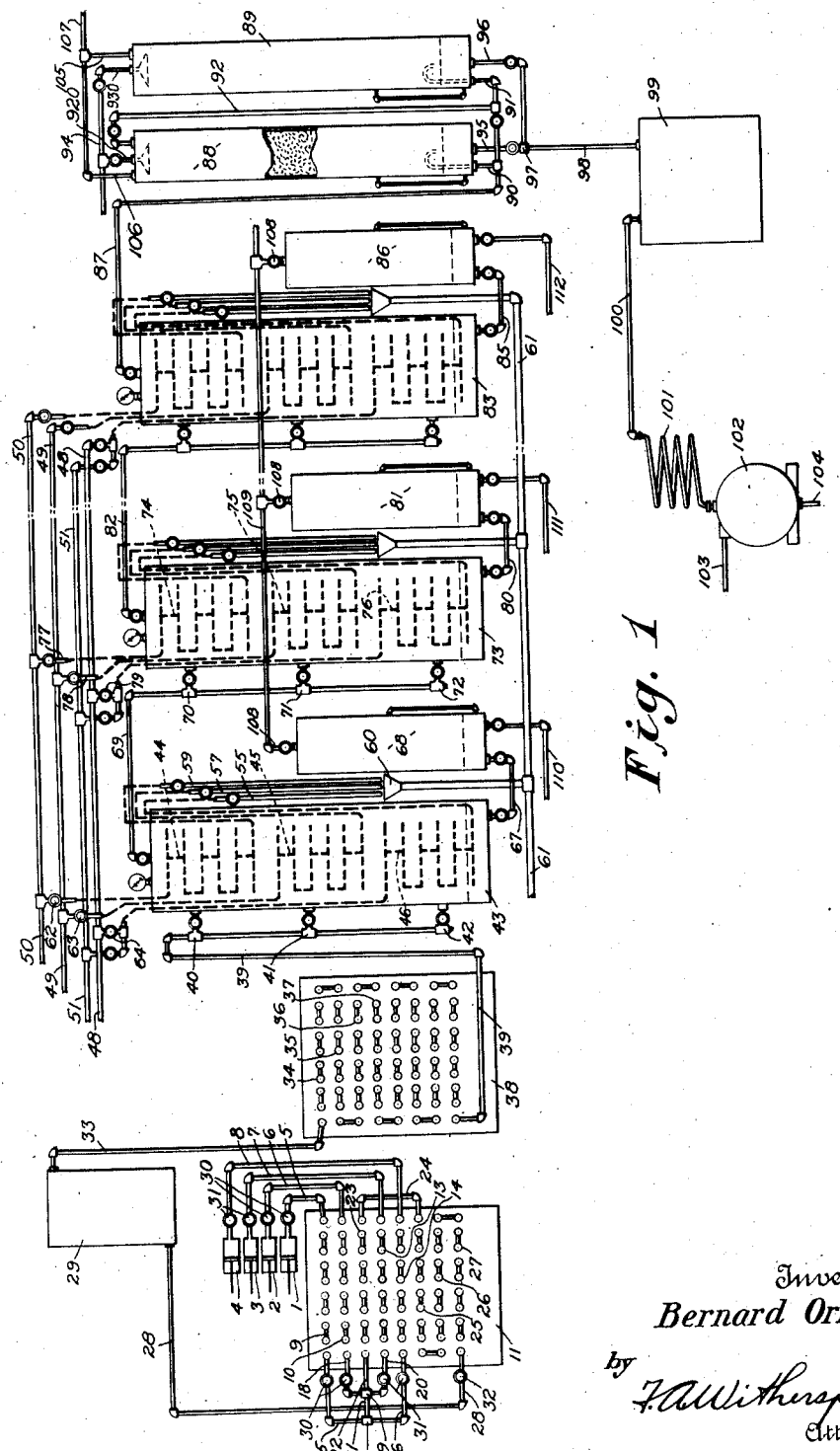
Figure 1 is a diagrammatic elevational view of an apparatus constructed in accordance with this invention and suitable for carrying out the present process.
Figure 2:
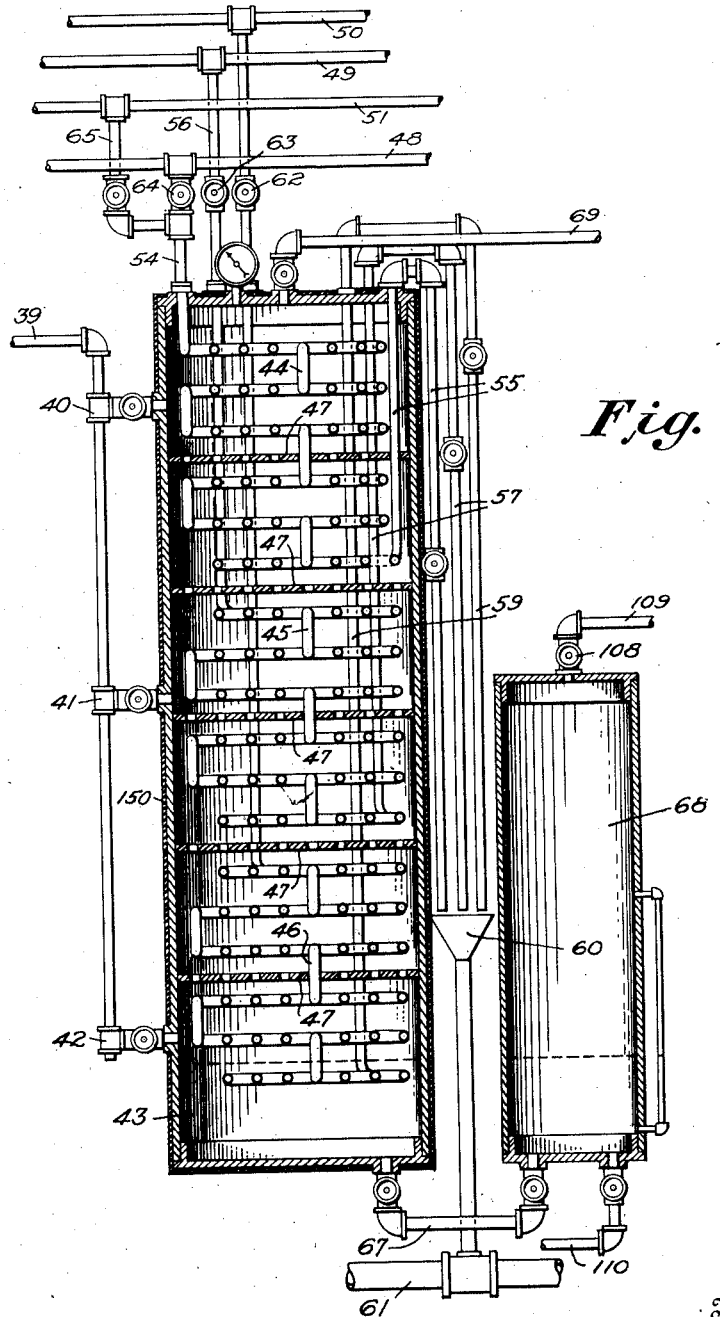
Figure 2 is an enlarged sectional detail view of one of the condensers and its associated tanks illustrated in Figure 1.
Figure 3:
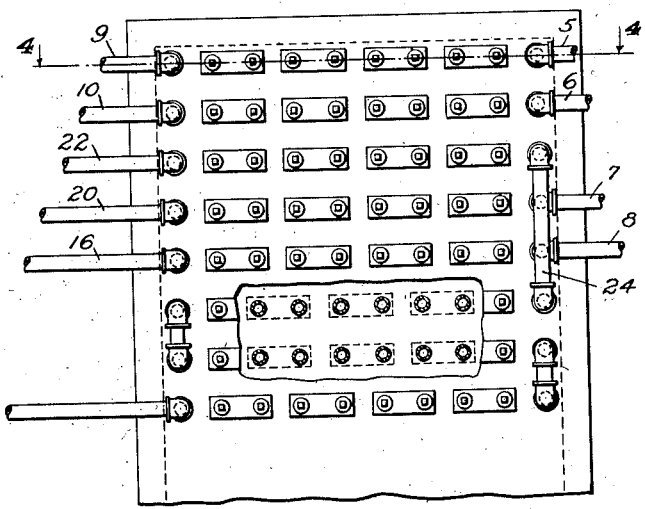
Figure 3 is an enlarged elevational view partially broken away of one of the furnaces illustrated ir Figure 1.
Figure 5:
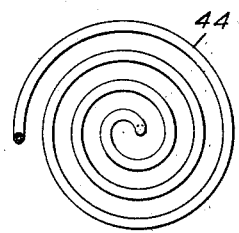
Figure 5 is a detail view of a portion of the cooling coils illustrated in Figure 1.
Figure 4:
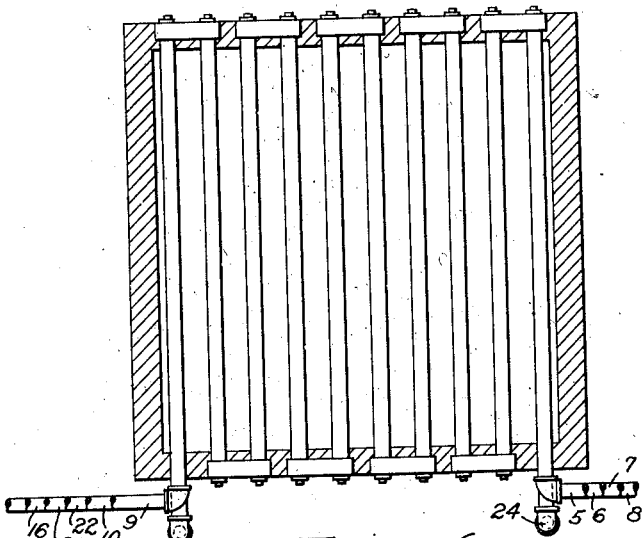
Figure 4 is a sectional view taken on the line 4—4 of Figure 3, looking in the direction of the arrows.
Figure 6:
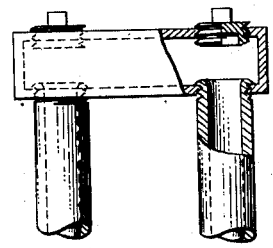
Figure 6 is an enlarged detail view partially in section, illustrating the connection between a pair of pipes employed in the furnace.

Referring to the accompanying drawings, 1, 2, 3, and 4 indicate pumps connected respectively with the pipes 5, 6, 7 and 8. The pumps 1 and 2 and pipes 5 and 6 supply oil to the coils of pipes 9 and 10 respectively of the furnace 11, while the pumps 3 and 4 and the pipes 7 and 8 respectively supply water to the coils 13 and 14 of said furnace, all as will be clear from Figure 1. The pipe 15 leads from the coil 9 and the pipe 16 leads from the coil 14, while the said pipes 15 and 16 meet at the point 17. In the same way, the pipe 18 leading from the coil 10 joins at the point 19 the pipe 20 leading from the coil 13. The points 17 and 19 are joined by the pipe 21, so that a mixture of water and oil as vapors from the coil 14 reaching the point 17 may be led through the pipe 21 to the point 19, and there joined with another vapor mixture of water and oil, and the two mixtures of vapors, together with the oil vapors evolved in coils 9 and 10 may be led from the point 19 through the pipe 22 to and through the coil 23, to and through the pipe 24, to and through the coils 25, 26, and 27 of the furnace, and out through the pipe 28 to the tank 29. It will be seen that the vaporization is effected as in my prior application, the unvaporized portion of the oil from coil 9 flowing by gravity toward and into the coil 14 where it encounters the region of nascent steam and is there vaporized at a temperature considerably below its normal boiling point, the combined vapors of oil and steam thence issuing outwardly and upwardly through pipe 16, and thence through pipes 21 and 22 into coil 23 along with the lighter hydrocarbon vapors from coil 9. Likewise the unvaporized oil from coil 10 flows through pipe 20 toward the region of nascent steam in the coil 13, is there completely vaporized, and the combined vapors of oil and steam thence pass through the pipes 20 and 22 into coil 23 along with the lighter hydrocarbon vapors from coil 10. It will be obvious that the amount of oil delivered to the furnace 11 by each of the pumps 1 and 2 may by means not shown be varied at will, and that the amount of water delivered to said furnace by each of the pumps 3 and 4 may be likewise varied at will. To facilitate these variations and thereby secure the proper proportions of oil to water in the furnace coils, I have provided the various oil pipes with the valves 30 and the various water pipes with the valves 31. In order to control the pressure and therefore the temperature of the mixed oil and water vapor delivered to the pipe 28 and the tank 29, the valve 32 is provided. The proportion of oil to water having been thus controlled to insure that the total of the latent heat in the oil passing into the tank 29 roughly or substantially equals the total of the latent heat in the water that accompanies said oil, the mixed oil and water vapors in said tank 29 may be passed through pipe 33 to and through various coils 34, 35, 36, 37, etc., of the furnace 38, and out of said furnace through pipe 39 to the valved connections 40, 41, and 42, leading into condenser 43. The condenser 43 as best illustrated in Figure 2, is provided with three coils 44, 45, and 46, and each coil is associated with one or more baffle plates 47. These coils are supplied with water at different temperatures from the mains 48, 49, and 50, and one of said coils may also be supplied with steam through the main 51. That is, coil 44 which may consist of a plurality of helically formed coils such as that shown in Figures 5, is joined to the main 48 by the valved connection 54, and the water after passing through said coil passes through the exit pipe 55. In the same way, the valved connection 56 leads water from the main 49 to and through the coil 45 and out the exit pipe 57. Likewise, the valved connection 58 leads water from the main 50 to and through the coil 46 and out of the exit pipe 59. The exit pipes 55, 57 and 59 empty into any suitable receptacle 60 connected with the conduit 61 leading to a sewer or to any desired place for re-cooling the used water.

It will thus be seen that by properly manipulating the valves 62, 63, and 64, water at different temperatures may be introduced into the coils, and therefore the condenser 43 is provided with different temperature zones. This latter result is enhanced by providing the valved connection 65 between the steam main 51 and one of the coils such as 44 so that steam may be also admitted into the condenser.

The mixed water and oil vapors having passed through the coils of the cracking furnace, 38, which are maintained at a cracking temperature of say above 1000° F., it will be found that a considerable proportion of the original oil has been cracked and now appears in the vapors leaving said furnace 38 in the form of gasoline and other successively heavier hydrocarbons. Consequently, when these various cracked oil vapors admixed with the vapors of the original oil and water are passed into the condenser 43 the operator may by suitably regulating the temperature of any given coil, subject the vapor mixtures to just the right temperature to condense out any desired fraction. This and succeeding condensers are heat insulated as indicated at 150, Figure 2, for a purpose to be disclosed below. This said oil fraction, along with any uncracked oil that may come over, is collected in the bottom of the condenser 43, whence it passes through the pipe 67 into the tank 68 and forms a gas seal which prevents the uncondensed vapors from leaving the system except through the top exit pipe 69. This last named pipe 69 is joined at the three points or connections 70, 71, and 72 with a worm condenser 73, which in all respects is a duplicate of the condenser 43, its coils 74, 75, and 76 being fed respectively by the valved connections 77, 78, and 79. And the condensate passes from the bottom of the second condenser 73 through the pipe 80 into the tank 81, while the uncondensed vapors pass out of the top exit pipe 82 to a third and duplicate condenser 83, and so on through say five or six, or more condensers, according to the specific purpose in hand. From the bottom of the last condenser the condensate will pass through the pipe 85 into the tank 86, and the uncondensed vapors will pass through the top exit pipe 87 to the bottoms of the scrubbers 88 and 89. Said pipe 87 is joined by the curved goose neck 90 which leads into the bottom of the scrubber 88 and by the goose neck 91 which leads into the scrubber 89 as shown. The pipe 92 joins the top of scrubber 88 with the bottom of the scrubber 89 as shown. Leading into the top of scrubber 88 is the pipe 920 and into the top of scrubber 89 is the pipe 930 while both pipes 920 and 930 are fed with oil from the pipe 94 capable of absorbing or dissolving gasoline from the gases in said scrubbers 88 and 89.

Leading from the bottom of scrubber 88 is a pipe 95 and leading from the bottom of scrubber 89 is a pipe 96 while the two pipes 95 and 96 join as at the point 97 the pipe 98 leading into the tank or reservoir 99 from which leads the pipe 100 joined to the condensing coil 101. Said coil 101 joins the condensing reservoir 102 from which leads the pipes 103 and 104 as shown. The tops of the scrubbers 88 and 89 are provided with the pipes 105 and 106 joined to the common exit pipe 107, as will be clear from Figure 1 of the drawings. Likewise the tops of the tanks 68, 81 and 86 are provided with the valve connections 108 joined by the common exit pipe 109 as illustrated. The oil fractions from the tanks 68, 81, 86 respectively through the pipes 110, 111, 112 are carried to suitable reservoirs not shown.

The operation and principles of this invention will be clear from the following:

As stated above, the underlying principle of the process resides in the proportion of oil to water employed. This proportion will depend upon the character of the oil being treated and further it will depend upon the particular product it is desired to produce.

That is, when gasoline and similar relatively light hydrocarbons are to be produced, as stated above, the total latent heat in the oil should be roughly or substantially equal to the total latent heat of the water which is fed with the oil. So that, if gasoline is to be produced, there will usually be employed, by weight, from about seven to ten times as much oil as water, while if lubricating oils are to be produced there will be employed, by weight, from say, one to seven times as much oil as water, all as will presently more fully appear. Stated in still other language, if we consider that the latent heat of the oil used is about 100 thermal units per pound, and that the latent heat of water is 970 thermal units per pound, then if we wish to make gasoline the above cracking operation in the furnace 38 will be carried out at about 1000° F. and we will so proportion the oil and water as to make the total latent heat of the oil in the cracking chamber substantially equal to the total latent heat of the water therein, which would mean that about 9.7 pounds of oil would be employed to each 1 pound of water, or roughly we may say that the ratio of oil to water in this case would be about 9 or 10 to 1, if gasoline and similar lighter hydrocarbons are to be made. On the other hand, I have discovered from large scale tests in which probably 200,000 gallons of various oils were employed, that if the latent heat of the water present is more than that of the oil, then the lubricating oils and other hydrocarbons heavier than gasoline will be produced at the expense of the gasoline products. In other words, if the volumes of the oil vapor and of the water vapor present in the cracking chamber remain say about substantially equal, as they are in fact when the said ratios of 9 or 10 to 1 are employed, or if they are otherwise maintained substantially equal then gasolines, naphthas, and similar lighter hydrocarbons will be principally produced, while if water vapor is allowed to accumulate in the cracking chamber in excess of the above mentioned volumes of mixed water and oil vapors as in fact it does when from only 1 to 7 parts of oil by weight to 1 part of water are originally employed, then the quantities of such lighter hydrocarbons produced will be cut down and more lubricating oils will be produced. In the case of the production of lubricating oils I have found that if I employ, say, one-half as much water by weight as oil or one-third or one-fourth, or one-fifth, or one-sixth, up to one-seventh, as much water, by weight, as of oil, then mostly lubricating oils will be produced, while if I go on and employ one-eighth, one-ninth, or one-tenth, as much water by weight as oil I will produce the lighter hydrocarbons of the gasoline order. This most surprising result I am unable to satisfactorily explain, but a plausible theory will appear hereinafter.

The important fact to be emphasized here, however, is the following: The above mentioned large scale tests have taught that if one observes the latent heats in the various oils to be employed, and is governed in his proportions of weight of oil to water by the above mentioned principles he will be enabled to so proportion the amount of water vapor to the oil vapor in the cracking chamber in each instance as to produce with certainty and efficiency a large variety of products at will.

To give a specific example, I may mention the making of gasoline from the well-known 34-degree Bowling Green gas oil, which has a paraffin asphaltum base. In this case, the latent heat of the oil may be taken as substantially 100 units per pound. I have taken this oil, have noted its latent heat, and have heated it up to 350° F. in the coil 9 of the furnace 11, and permitted the same to flow continuously in contact with an amount of water in coil 27, whose total latent heat was equivalent to the total latent heat in the amount of oil which flowed through coil 9. In other words, I took about 9.7 pounds of this oil to each pound of water, which made a ratio of oil to water of about 9 or 10 to 1. I have further found by these tests that although the sensible heats are considerable in the case of both the water and the oil when we come to large scale tests, yet they did not seem to make a sufficient amount of difference to stress the same in this specification, although they do make some difference, and if the operator wishes to refine on this process, he should take them into account, and make the totals of the sensible and latent heats in the oil substantially equal the total of the sensible and latent heats in the water employed.

It will further be observed that the temperatures were such that all the oil present was vaporized at points well below those that are necessary to carbonize the oil, and that therefore in this process little or no carbon was produced in the vaporizing furnace at all. This is an important feature of the invention. Now, the mixed oil and water vapors proportioned as above mentioned in the case of the Bowling Green oil was carried through the cracking furnace 38 at a temperature of say about 1000° F. when I readily obtained from 20 to 22% of gasoline, on the first run through the system. I further found that by repeatedly carrying the residue back through the cracking chamber 38 in the manner above described, it was perfectly feasible to obtain as high as from 50 to 60% of gasoline from this same oil. On the other hand, I still further subjected this same Bowling Green oil to large scale tests for the production of various kinds of lubricating oil, with the following results:

When I employed a weight of oil which was only twice as much as the weight of water, I got only about 2% of gasoline and from 18 to 20% of lubricating oil, known commercially as "100 stock." When I employed a ratio of oil to water of only 4 to 1, I obtained nine per cent of gasoline and about 10 to 12% of lubricants. In another run I employed a ratio of 5.7 of oil by weight to 1 of water, and got 12.9% of gasoline and a smaller percentage of lubricants. In fact, I made a large number of runs on this oil, using various proportions of oil to water, and various temperatures in the furnace and cracking chamber which are not necessary to detail but would call attention to a number of runs in which I employed seven parts by weight of this oil to one part by weight of water, with a temperature of 900 to 1000° F. in the cracking furnace 38, and obtained 19% of gasoline and only a few per cent of lubricating oils, thus showing conclusively that an excess of latent heat units in the water vapor present retards the production of the lighter hydrocarbons. This same general action was found in a large number of other oils such for example as 21-degree Bé. Mexican gas oil, which has a somewhat higher latent heat than the above mentioned Bowling Green oil. By carrying out precisely the same process with this Mexican oil, it was found that proportions of 4.5 parts by weight of oil to one of water would yield about 30% of gasoline. That is, its latent heat being about 200 units per pound, it required only about one half the amount of oil to one pound of water to produce gasolines as was required in the case of the Bowling Green oil. Again, I employed a 36-degree Bé. Pennsylvania gas oil, which has a latent heat of 100 units per pound and got with the same proportions substantially the same results as with the Bowling Green oil. In the case of a 48-degree Bé. kerosene, I could get, of course, no lubricants at all, but by using a ratio of oil to water of about 10 or 12 to 1, I got from 30 to 40% of gasoline on the first run.

Without giving the details of all the various oils that I have tried out on a large scale in this case, will say that I am convinced that the above large scale tests show conclusively that if one follows the above principles of causing the total of latent heat carried by the oil vapor to be substantially equal to the total of the latent heat carried by the water vapor employed, he is guided at once to the correct weight of water and oil if gasolines are to be produced, and thus is he enabled in this cracking process to get maximum efficiencies in the production of gasolines, no matter what his oil may be. And I am equally convinced of the same principles above stated being a sure guide to the production of lubricants with maximum efficiencies.

It is in these features that my invention so radically differs from all prior inventions with which I am familiar. Heretofore, as is well known, various inventors have tried all conceivable haphazard mixtures of water and oil and some of them have gotten promising results, and some of them no results at all, but in no case could they with certainty obtain the high efficiencies I attain. In my case, on the other hand, knowing the latent heat of vaporization of the oil I can approximately calculate in advance just what my results will be, and my large scale tests have demonstrated this to be true. In other words, it should be carefully noted that in carrying out this process, one has two ratios to deal with. The first is the ratio of the total latent heat in the oil vapor present and the total latent heat in the water vapor present, and from this total latent heat ratio, one readily obtains the weight of oil to be used, and the weight of water to be used. It is the ratio of these weights of oil and water that constitute said second ratio. Given this second ratio, one readily calculates the volume of oil to be used and the volume of water to be used. So again it can be pointed out that my process differs radically from the prior processes in so far as I am aware, in that no one has heretofore ever deliberately led unvaporized water to his cracking chamber along with his vaporized oil and water in order to produce lubricating products. I deliberately do this, for I believe a plausible explanation of the phenomena resides in the fact that if we have a mixture of oil vapor and of water vapor containing substantially the same total amounts of latent heat units, we have the most favorable conditions possible for an interchange of molecules in the oil and the production of lighter hydrocarbons. That is to say, when this condition exists the natural tendency of the hydrocarbon chain is to break down into simpler hydrocarbons, thus producing hydrocarbons of the gasoline order, which actual tests seem to prove to be the case. On the other hand, if we increase the amount of water vapor as we do in the making of lubricating oils or in addition introduce to the cracking chamber a greater or less amount of water in the liquid phase, we surely destroy the substantial equality of the latent heat units present, and very likely retard the rearrangement of molecules in the hydrocarbon chain. Said molecules thus do not so completely break up, with the result that we produce the lubricating oils. Whatever may be the true explanation, the above large scale tests have demonstrated to my satisfaction at least time and again that this theory is plausible, and certainly the procedure is thoroughly practicable and can be carried out by even those unskilled in the art, as has also been done in practice.

It is found in practice however that the operation works better if the water when mixed with the oil is at a temperature of about 100° F. If it is higher, it seems to go into steam before a proper mixture is had, and if it is lower its sensible heat seems to be sufficient in some cases to partially upset the above calculations when based on latent heats alone. The temperatures of the vapors in the furnace 11 are taken by suitable instruments, and said furnace is so heated as to maintain said vapors at the desired points of say 350° F.

It is obvious that those skilled in the art may vary the procedure as well as the apparatus without departing from the spirit of the invention, and therefore, I do not wish to be limited to the above disclosure except as may be required by the claims.

What I claim is:

1. A method of treating a hydrocarbon oil which comprises heating the oil to a temperature sufficient to vaporize the lighter fractions thereof but insufficient to completely vaporize the same; independently heating water to produce a region of nascent steam; regulating the proportion of oil to water so that with any oil treated the product of the latent heat of vaporization of the oil and the weight of said oil shall substantially equal the product of the latent heat of vaporization of the water and the weight of said water; conveying the unvaporized oil to said region of nascent steam where the oil is completely vaporized; and subjecting the resultant mixture of oil vapors and steam to additional heating.

2. A method of treating a hydrocarbon oil which comprises heating the oil to a temperature sufficient to vaporize the lighter fractions thereof but insufficient to completely vaporize the same; independently heating water to produce a region of nascent steam; regulating the proportion of oil to water so that the total latent heat of vaporization of the oil will be substantially equal to the total latent heat of vaporization of the water; conveying the unvaporized oil to said region of nascent steam where the oil is completely vaporized; and subjecting the resultant mixture of oil vapors and steam to additional heating.

3. A method of cracking a hydrocarbon oil which comprises introducing a stream of oil into a heater; separately introducing a stream of water into said heater; proportioning the oil and water so that the total latent heat of vaporization of the oil substantially equals the total latent heat of vaporization of the water; subjecting said oil and water to heat to vaporize the lighter ends of said oil at a point remote from said stream of water while simultaneously creating a region of nascent steam at the end of said stream of water; leading the unvaporized oil to said region for complete vaporization; and subjecting the resultant mixture of oil vapors and steam to additional heating.

4. An apparatus for treating oil which comprises a furnace, a coil in the upper portion of said furnace, a second coil in a lower portion of said furnace, and means for removing vapors from said coils, including a vertical connection between said coils constituting a gravity flow passage for liquid unvaporized in the first mentioned coil entering said second coil for vaporization therein.

5. An apparatus for treating oil which comprises a heater, a coil therein for heating oil, a second coil disposed in a plane lower than said first mentioned coil, a substantially vertical connection between said coils whereby oil unvaporized in said first coil may flow by gravity into said second coil, and a vapor outlet from both of said coils in said vertical connection.

6. An apparatus for treating oil which comprises a furnace, a coil in the upper portion of said furnace, a second coil in a lower portion of said furnace, a vertical connection between said coils whereby liquid may flow by gravity from the first mentioned coil into said second coil, a vapor outlet from both of said coils in said vertical connection, means connecting with said vapor outlet for further heating the vapors.

7. An apparatus for treating oil which comprises a furnace, a coil in the upper portion of said furnace, a second coil in a lower portion of said furnace, a vertical connection between said coils whereby liquid may flow by gravity from the first mentioned coil into said second coil, a vapor outlet in said vertical connection, and a third coil disposed in said furnace intermediate said first and second coils and communicating with said vapor outlet.

In testimony whereof I affix my signature.

BERNARD ORMONT.